No. 831,363. PATENTED SEPT. 18, 1906.
A. DE L. LITTLE.
SWINGLETREE.
APPLICATION FILED NOV. 10, 1905.
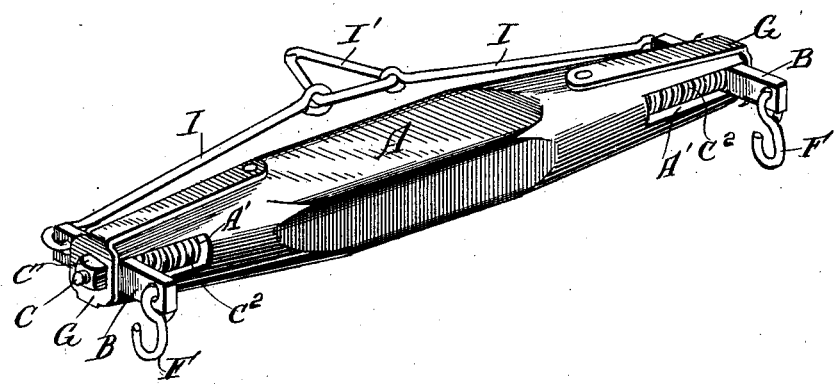
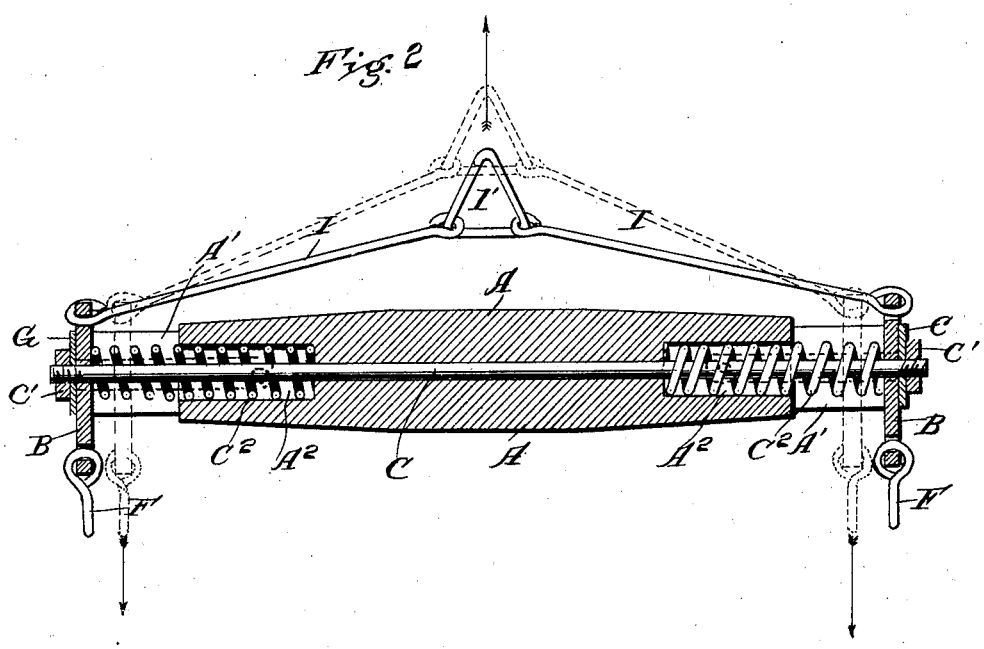
WITNESSES:
INVENTOR
ALBERT D. LITTLE
BY
ATTORNEYS

UNITED STATES PATENT OFFICE.

ALBERT DE LONG LITTLE, OF GAMEWELL, NORTH CAROLINA.

SWINGLETREE.

No. 831,363.　　　Specification of Letters Patent.　　　Patented Sept. 18, 1906.

Application filed November 10, 1905. Serial No. 286,672

*To all whom it may concern:*

Be it known that I, ALBERT DE LONG LITTLE, a citizen of the United States, residing at Gamewell, in the county of Caldwell and State of North Carolina, have made certain new and useful Improvements in Swingletrees, of which the following is a specification.

My invention is an improvement in swingletrees; and it consists in certain novel constructions and combinations of parts, as will be hereinafter described and claimed.

In the drawings, Figure 1 is a perspective view of a swingletree embodying my invention, and Fig. 2 is a sectional elevation thereof with the motion of the draft-bars indicated in dotted lines.

The swingletree A may in general respects be of ordinary construction. It is, however, provided at its ends with the longitudinal slots A′, in which operate the draft-bars B. Bolts C extend longitudinally within the slots A′, and mortises A² extend from the inner walls of said slots and receive the springs C² when the latter are compressed by the inward movement of the draft-bars in the operation of the invention. The bolts C are braced at their outer ends by the keepers G, the latter being in the form of straps extending over the ends of the swingletree and along the same and secured thereto. The bolts C extend beyond the keepers and are threaded on their ends to receive the nuts C′. The draft-bars D are perforated between their ends to receive the bolts C and slide along said bolts in and out in the use of the invention. At their rear ends the draft-bars connect with the plow, vehicle, or other device to be pulled, while their front ends are provided with hooks F or other suitable devices, to which the tugs or traces may be connected. In connecting the draft-bars with the plow or the like I prefer to employ the draft-rods I, connected at their inner ends with a suitable link I′ and at their outer ends with the rear ends of the draft-bars, as shown in the drawings. The springs C² encircle the bolts C and bear against the inner sides of the draft-bars and tend to force the same outwardly, holding them normally out against the keeper-straps at the ends of the swingletrees and yet permitting them to move inwardly under the stress of draft, especially in starting the load. I thus provide a swingletree in which the strain of starting the load will be relieved by the spring action, so that injury to the draft devices, as well as to the team, will be avoided, and I arrange the tension-spring in such manner as to prevent any danger of breaking or otherwise injuring the same, so that I am able to provide an efficient and durable device at a small expense.

Having thus described my invention, what I claim as new, and desire to secure by Letters Patent, is—

1. A swingletree having at its ends longitudinal slots, and the mortises extending from the base-walls of said slots, and a keeper-plate extending over the ends of the swingletree and slots and having bolt-holes in line with the said slots, the bolts extending through the slots and mortises and projecting through the keeper-plates, the nuts on the ends of the bolt, the springs on the bolts, the draft-bars slidable along the bolts between the springs and the keeper-plates, and the draft devices connected with the rear ends of the draft-bars, all substantially as and for the purposes set forth.

2. The combination of the swingletree, the draft-bars held to the swingletree and movable bodily in and out with respect thereto, and the draft devices in connection with said draft-bars, substantially as set forth.

3. The combination of the swingletree slotted at its ends, the bolts extending through said slots, the draft-bars movable along said bolts, and the spring acting on the draft-bars, substantially as set forth.

4. A swingletree provided at its ends with draft-bars movable bodily in and out with respect to the swingletree, and springs acting upon said draft-bars, substantially as set forth.

5. A swingletree provided at its ends with the laterally-yielding draft-bars and with devices connecting the rear ends of said bars and having means for connection with the object to be pulled.

6. A swingletree having the longitudinal end slots and the keeper-plates extending over the same, the bolts extending longitudinally in said slots, the keeper-bars sliding bodily along said bolts, and the springs on the bolts and actuating the draft-bars, substantially as set forth.

7. The combination of the swingletree, the draft-bars at the opposite ends of and movable bodily along the swingletree, and springs for actuating said draft-bars, substantially as set forth.

8. The combination of the swingletree, the longitudinal bolts at the ends thereof, the draft-bars slidable along said bolts, the draft-rods connected at their outer ends with the rear ends of said draft-bars, the link connecting the inner ends of said draft-rods, and a spring for pressing the draft-bars normally outward, substantially as set forth.

9. The combination with a swingletree having the longitudinal slots in its ends, of draft-bars movable bodily in said slots and springs for actuating said draft-bars, substantially as set forth.

ALBERT DE LONG LITTLE.

Witnesses:
W. K. SHELL,
LAWRENCE WAKEFIELD.